(12) United States Patent
Thunga Gopal et al.

(10) Patent No.: US 10,829,003 B2
(45) Date of Patent: Nov. 10, 2020

(54) CONTROLLING A VEHICLE EQUIPPED WITH ENGINE START-STOP CONTROL LOGIC IN RESPONSE TO VEHICLE STOP EVENT TYPE

(71) Applicant: Cummins Inc., Columbus, IN (US)

(72) Inventors: Arun Prakash Thunga Gopal, Columbus, IN (US); Martin T. Books, Columbus, IN (US); Jennifer Kay Light-Holets, Greenwood, IN (US); Joseph E. Paquette, Columbus, IN (US); John P. O'Brien, Columbus, IN (US)

(73) Assignee: Cummins Inc., Columbus, IN (US)

( * ) Notice: Subject to any disclaimer, the term of this patent is extended or adjusted under 35 U.S.C. 154(b) by 64 days.

(21) Appl. No.: 16/123,449

(22) Filed: Sep. 6, 2018

(65) Prior Publication Data
US 2019/0001981 A1    Jan. 3, 2019

Related U.S. Application Data

(63) Continuation-in-part of application No. PCT/US2017/022906, filed on Mar. 17, 2017.

(51) Int. Cl.
*B60L 58/12* (2019.01)
*B60W 30/18* (2012.01)
(Continued)

(52) U.S. Cl.
CPC ............. *B60L 58/12* (2019.02); *B60W 10/06* (2013.01); *B60W 10/08* (2013.01); *B60W 20/15* (2016.01);
(Continued)

(58) Field of Classification Search
CPC ............. F02N 11/0818; F02N 11/0829; F02N 11/0833; F02N 11/0837; B60W 30/18018;
(Continued)

(56) References Cited

U.S. PATENT DOCUMENTS

| 6,230,496 B1 | 5/2001 | Hofmann et al. |
| 7,181,409 B1 | 2/2007 | Murakami et al. |

(Continued)

FOREIGN PATENT DOCUMENTS

EP    1 410 364 B    10/2005

OTHER PUBLICATIONS

International Search Report for PCT International Application Serial No. PCT/US17/22906, completed Jun. 9, 2017, 12 pages.

*Primary Examiner* — Sizo B Vilakazi
*Assistant Examiner* — Anthony L Bacon
(74) *Attorney, Agent, or Firm* — Taft Stettinius & Hollister LLP

(57) ABSTRACT

Controls for improved performance of a vehicle equipped with start-stop control logic are disclosed. Deviation from nominal engine start-stop control logic for the internal combustion engine occurs when a predetermined mission related type of stop event will occur or is occurring that is different from other stop event types that are controlled by the nominal engine start-stop control logic. At least one of a location and a payload associated with the mission related stop event type is provided as an input to the controller before the vehicle arrives at the stop event so that operating parameters of the vehicle are controlled accordingly.

33 Claims, 5 Drawing Sheets

(51) Int. Cl.
  *B60W 10/06*    (2006.01)
  *B60W 20/15*    (2016.01)
  *B60W 10/08*    (2006.01)
  *F02N 11/08*    (2006.01)
  *B60K 6/442*    (2007.10)
  *B60W 10/02*    (2006.01)

(52) U.S. Cl.
  CPC .. *B60W 30/18018* (2013.01); *B60W 30/1819* (2013.01); *F02N 11/0818* (2013.01); *F02N 11/0829* (2013.01); *F02N 11/0833* (2013.01); *F02N 11/0837* (2013.01); *B60K 6/442* (2013.01); *B60W 10/023* (2013.01)

(58) Field of Classification Search
  CPC ...... B60W 20/15; B60W 20/16; B60W 10/06; B60W 10/08
  See application file for complete search history.

(56) References Cited

U.S. PATENT DOCUMENTS

| | | | |
|---|---|---|---|
| 7,778,773 B2 | 8/2010 | Yaqub et al. | |
| 8,219,312 B2 | 7/2012 | Davidson et al. | |
| 8,290,701 B2 | 10/2012 | Mason et al. | |
| 8,543,270 B2 | 9/2013 | Kelty et al. | |
| 8,886,453 B2 | 11/2014 | Cerecke et al. | |
| 9,045,132 B1 | 6/2015 | Zhao et al. | |
| 9,079,505 B1 | 7/2015 | Hyde et al. | |
| 9,208,626 B2 | 12/2015 | Davidson | |
| 9,292,889 B2 | 3/2016 | Garden | |
| 9,315,182 B2 | 4/2016 | Kuhlman | |
| 9,440,550 B2 | 9/2016 | Jones | |
| 2005/0131645 A1 | 6/2005 | Panopoulos | |
| 2008/0097661 A1 | 4/2008 | Moran | |
| 2010/0145562 A1* | 6/2010 | Moran | B60K 6/46 701/22 |
| 2012/0277982 A1* | 11/2012 | Weaver | F02D 41/123 701/112 |
| 2013/0234868 A1 | 9/2013 | Koth | |
| 2014/0074329 A1 | 3/2014 | Yang et al. | |
| 2014/0343830 A1 | 11/2014 | Elwart et al. | |
| 2015/0046070 A1* | 2/2015 | Awadi | F02D 17/04 701/112 |
| 2015/0329119 A1* | 11/2015 | Sujan | B60W 30/18 701/54 |
| 2015/0345621 A1 | 12/2015 | Sujan et al. | |
| 2016/0039295 A1 | 2/2016 | Madurai-Kumar et al. | |
| 2016/0229408 A1 | 8/2016 | Stenson | |
| 2016/0273927 A1 | 9/2016 | Kitajima et al. | |
| 2017/0072974 A1 | 3/2017 | Morita et al. | |
| 2017/0080919 A1* | 3/2017 | Follen | F02N 11/0837 |
| 2017/0253245 A1* | 9/2017 | Khafagy | B60K 28/04 |

* cited by examiner

CONTROLLING A VEHICLE EQUIPPED WITH ENGINE START-STOP CONTROL LOGIC IN RESPONSE TO VEHICLE STOP EVENT TYPE

The present application is a continuation-in-part of International Application Ser. No. PCT/US2017/022906 filed on Mar. 17, 2017, which is incorporated herein by reference.

BACKGROUND

The present application relates generally to engine start-stop controls based on a stop event type for a vehicle, where the engine start-stop controls account for stop locations, stop duration and/or payload variations associated with the stop event.

In automotive vehicles that travel along a predetermined route, the stop locations, duration of the stops, and/or payload of the vehicle at each stop location can vary along the route. For example, traffic stops can be for a relatively brief duration as compared to a stop for pick-up or drop-off of a payload such as passengers and/or cargo. In addition, the payload of the vehicle can vary along the route depending on whether passengers and/or cargo are being dropped off or loaded onto the vehicle, causing a change in mass for the vehicle that is associated with the stop event.

For vehicles with engine start-stop capabilities, these route conditions can influence the vehicle performance and fuel efficiency since the nominal engine start-stop control logic of the vehicle controller that controls start-stop decisions is configured to optimize fuel efficiency and/or performance for traffic-related start-stop conditions. Since the location, timing and duration of these stops is not known in advance, the nominal engine start-stop control logic for traffic-related stop events may not optimize fuel efficiency and performance at the predetermined stop locations associated with the route since the nominal engine start-stop control logic is calibrated against predetermined assumptions regarding stop durations and vehicle payload. Thus, there remains a significant need for the apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One example of a system, method, and apparatus includes operating a start-stop vehicle system including an internal combustion engine and a controller configured to determine a stop event type associated with a vehicle stop event, control the start-stop of the internal combustion engine during the vehicle stop event with one or more nominal engine start-stop control parameters in response to a first stop event type being determined by the controller, and control the start-stop the internal combustion engine during the vehicle stop event with one or more alternative engine start-stop control parameters that deviate from the one or more nominal engine start-stop control parameters in response to a second stop event type being determined by the controller. In certain embodiments, a predetermined route based operating requirement, such as at least one of an emission requirement, a stop location, a stop duration and a payload associated with the second stop event type, is provided as an input to the controller before the vehicle arrives at the stop event and/or starts the route.

Another example of a system, method, and apparatus includes determining a stop event type associated with the vehicle stop event; controlling engine start-stop, with the controller, during the vehicle stop event with one or more nominal engine start-stop control parameters in response to a first stop event type being determined by the controller; and controlling engine start-stop, with the controller, during the vehicle stop event with one or more alternative engine start-stop control parameters that deviate from the one or more nominal engine start-stop control parameters in response to a second stop event type being determined by the controller. In certain embodiments, a predetermined route based operating requirements such as at least one of an emission requirement, at least one of a stop location, a stop duration, and a payload associated with the second stop event type is provided as an input to the controller before the vehicle arrives at the stop event and/or starts the route.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

Figure 1:
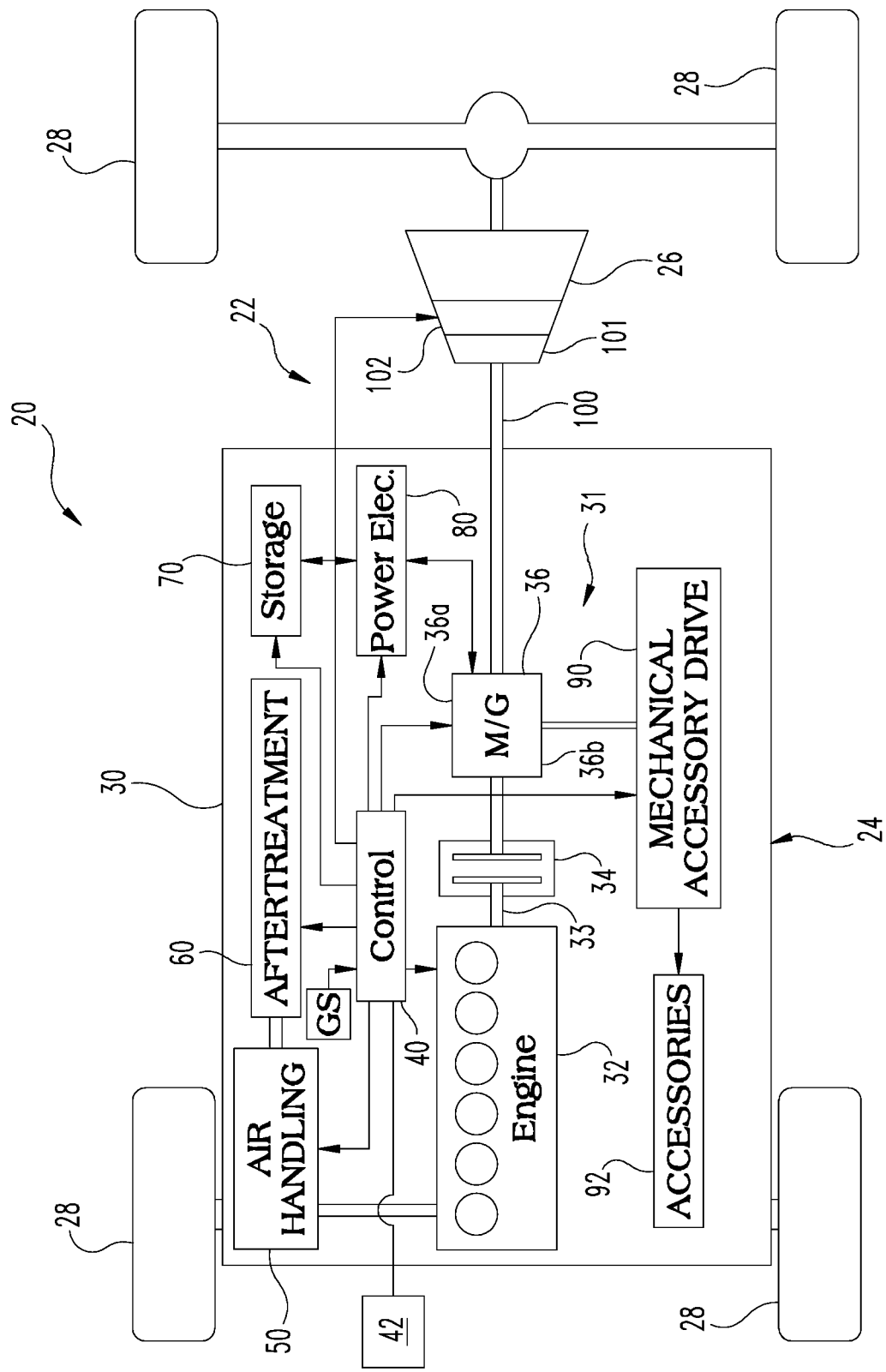
FIG. 1 illustrates a partially diagrammatic view of an exemplary vehicle.

With reference to FIG. 1 there is illustrated a partially diagrammatic view of a vehicle 20 including an example powertrain 22. It shall be appreciated that the configuration and components of vehicle 20 and of powertrain 22 are but one example, and that this disclosure contemplates that a variety of different hybrid and non-hybrid vehicles and powertrain configurations and components may be utilized. Powertrain 22 includes a pretransmission hybrid system 24, a transmission 26, and ground engaging wheels 28. Depicted powertrain 22 system is a series-parallel hybrid (selectable with hybrid clutch 34) system, although the system may be, without limitation, a parallel configuration, a series configuration, a series-parallel hybrid system, and/or a non-hybrid system that is powered for stop-start exclusively by an engine or by a motor (electric vehicle).

It should be appreciated that in this embodiment, the propulsion of vehicle 20 is provided by the rear wheels 28; however in other applications front wheel drive and four/all-wheel drive approaches are contemplated. In one form vehicle 20 is an on-road bus, delivery truck, haul truck, service truck or the like; however in other forms vehicle 20 may be of a different type, including other types of on-road or off-road vehicles.

Pretransmission hybrid system 24 includes hybrid power system 30. Hybrid power system 30 includes internal combustion engine 32, a hybrid clutch 34, motor/generator 36, controller 40, air handling subsystem 50, aftertreatment equipment 60, electrical power storage device 70, electrical power electronics device 80, and a mechanical accessory drive subsystem 90 operable to drive one or more accessories 92, such as a heating, ventilation, and/or air conditioning (HVAC) accessories. System 30 is illustrated in the form of a parallel hybrid power source 31 such that engine 32 and/or motor/generator 36 can provide torque for power train 22 depending on whether hybrid clutch 34 is engaged. Other hybrid and non-hybrid forms are also contemplated.

It should be appreciated that motor/generator 36 can operate as a motor 36a powered by electricity from storage device 70, or as an electric power generator 36b that captures electric energy. In other operating conditions, the motor/generator 36 may be passive such that it is not operating. In the depicted form, motor/generator 36 has a common rotor and a common stator, and is provided as an integrated unit; however in other embodiments a completely or partially separate motor, generator, rotor, stator, or the like may be employed. The designated motor/generator 36 is intended to encompass such variations. Furthermore it should be appreciated that in alternative embodiments of system 30 some of these features, such as air handling subsystem 50, aftertreatment equipment 60, and/or mechanical accessory drive 90 may be absent and/or other optional devices/subsystems may be included.

In certain embodiments the motor/generator 36 may comprise a hydraulic or pneumatic pump rather than an electric motor/generator. It shall be appreciated that references to a motor/generator herein are intended to encompass both electric motor/generators and non-electric motor/generators such as those comprising hydraulic or pneumatic pumps. Furthermore, power storage device 70 of system 30 may comprise one or more electrochemical batteries, supercapacitors or ultracapacitors, or may alternatively store energy in a different, non-electrical medium such as an accumulator found in a hydraulic or pneumatic hybrid system. It shall be appreciated that references to a power storage device herein are intended to encompass electrochemical storage batteries, other electrical storage devices such as capacitors, and non-electrical energy storage devices such as accumulators utilized in hydraulic or pneumatic hybrid systems.

In the illustrated embodiment, engine 32 is of a four-stroke, diesel-fueled, compression ignition (CI) type with multiple cylinders and corresponding reciprocating pistons coupled to crankshaft 33, which typically would be coupled to a flywheel. Crankshaft 33 is mechanically coupled to controllable hybrid clutch 34. Engine 32 may be of a conventional type with operation modifications to complement operation in system 30. In other embodiments, engine 32 may be of a different type, including different fueling, different operating cycle(s), different ignition, or the like.

Powertrain 22 includes an output shaft 100 that connects engine 32 and/or motor/generator 36 to transmission 26. In one embodiment, transmission 26 is an automatic transmission including a clutch 102 that is a torque converter with a lock-up clutch to selectively engage output shaft 100 to transmission 26. In another embodiment, transmission 26 is an automated manual transmission that includes a clutch 102 that is controllable to selective engage output shaft 100 to transmission 26. In still other embodiments a driveline lock mechanism 101 can be provided to engage output shaft 100 and prevent movement of vehicle 20 in response to one or more control outputs, such as discussed further below.

Vehicle 20 further includes a controller 40 which may be configured to control various operational aspects of vehicle 20 and powertrain 22 as described in further detail herein. Controller 40 may be implemented in a number of ways. Controller 40 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

Controller 40 may be provided as a single component, or a collection of operatively coupled components, and may comprise digital circuitry, analog circuitry, or a hybrid combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are distributed throughout hybrid power system 30 that each includes one or more processing units and non-transitory memory. For the depicted embodiment, controller 40 includes a computer network interface to facilitate communications using standard Controller Area Network (CAN) communications or the like among various system control units. It should be appreciated that modules or other organizational units of controller 40 refer to certain operating logic performing indicated operations that may each be implemented in a physically separate controller of controller 40 and/or may be virtually implemented in the same controller.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in start-stop control of internal combustion engines, improvements in engine torque generation and torque control, engine fuel economy performance, improvements in noise, vibration and harshness control for internal combustion engines, improvements in performance or operation of aftertreatment systems and/or components of vehicle systems, and/or improvements in emissions reduction. Without limitation, example and non-limiting technological fields that are improved include the technological fields of internal combustion engines with hybrid powertrains, internal combustions operating according to engine start-stop control logic, and related apparatuses and systems as well as vehicles including the same.

In certain embodiments, the route data and other information may be provided to the controller 40 by an intelligent transportation system (ITS) or similar system. An ITS generally refers to the integration of information and communication technologies with transport infrastructure to improve economic performance, safety, mobility and environmental sustainability. An ITS may include real-time traffic information systems that collect data on traffic conditions, aggregate and translate the data, and disseminate the traffic data through various technologies.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 2:
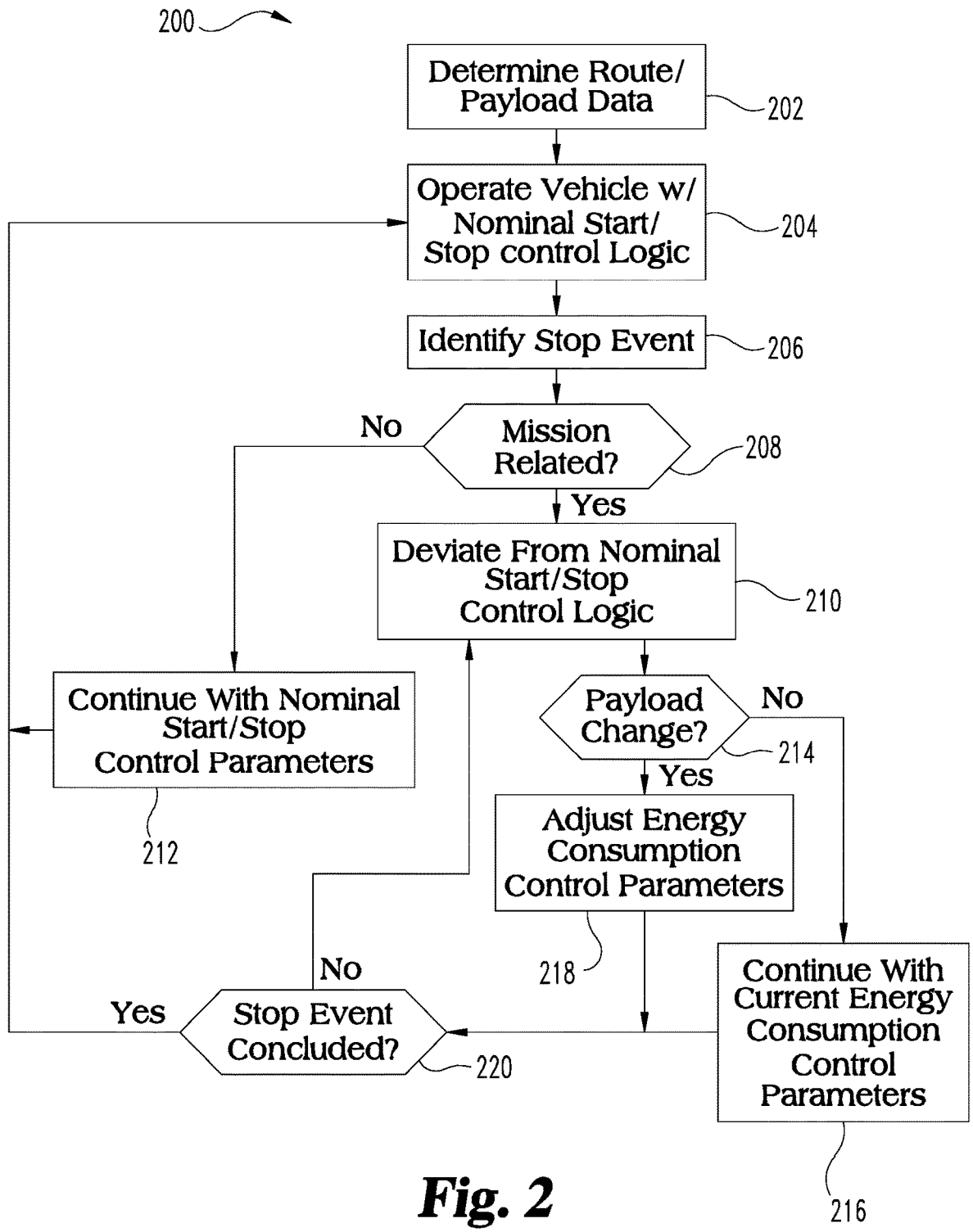
FIG. 2 illustrates a flow diagram of an exemplary control procedure for an engine start-stop operation of the exemplary vehicle.

With reference to FIG. 2 there is illustrated a flow diagram of exemplary engine start-stop control procedure 200 which may be implemented in a control system, for example, such as a controls system including controller 40 described above in connection with FIG. 1. The controller 40 operates according to procedure 200 in one embodiment to identify a stop event type and continue operations with the nominal engine start-stop control logic of engine 32 or to deviate from the nominal engine start-stop control logic of engine 32 based on the stop event type. It is contemplated that controller 40 can be an engine controller that controls operation of powertrain 22, although other controller types for controller 40 are also contemplated, such as a transmission controller that controls operations of transmission 26, or an engine controller that provides control signals for execution by a transmission controller.

Procedure 200 includes an operation 202 to determine route data for the route and in certain embodiments payload data associated with the route. The route data and/or payload data can be input to controller 40 before the vehicle begins operations along the route, and/or before one or more predetermined or planned stop events along the route occur. In certain embodiments, pertinent details regarding the route data or data on planned stop events are input into controller 40. In one embodiment, for certain vehicles such as buses or other transportation vehicles having a passenger payload, there is a predetermined timetable for each vehicle that describes when the vehicle will be arriving at and/or departing from the various stop locations along the route. The stop locations along the route are also known with certainty and provided to controller 40. In another example, such as for a delivery vehicle for packages or other payload, data regarding the pre-planned delivery and/or pick-up locations and associated payloads for each stop location is provided to controller 40. This payload data is input into controller 40 to be incorporated into the decision-making with respect to energy consumption management in response to a vehicle stop event.

Control procedure 200 includes an operation 204 which controls start-stop operation of engine 32 along the route according to any existing nominal engine start-stop control logic. Operation 204 can include operating a vehicle including internal combustion engine 32 and controller 40, which can be configured to conditionally stop and re-start the internal combustion engine 32 in response to a vehicle stop event.

Procedure 200 continues at operation 206 to identify a stop event type for the vehicle. At conditional 208 it is determined if the stop event is mission related. A mission related stop event is a planned or scheduled stop along a route or trip that is a non-traffic related stop event. For example, in response to determining at conditional 208 the vehicle stop event is not mission-related, i.e. the stop is unplanned or unscheduled such as would occur due to traffic or traffic control devices, engine start-stop procedure 200 continues at operation 212 to continue to operate with nominal engine start-stop control logic. In one embodiment, the nominal engine start-stop control logic provides a stop event variable as an output to provide a controlled engine stop at the non-mission related stop event. The timing and duration of the engine stop during the stop event is based on any nominal engine start-stop control logic.

In certain embodiments for identifying the mission related stop event, such as in bus or passenger vehicle applications, pre-programming the controller 40 with a timetable and a real-time-clock configures controller 40 to accurately differentiate between traffic related stops and mission related stops, such as for loading and unloading payload from the vehicle. The pre-planned stop locations combined with a GPS location determination for the vehicle can reduce uncertainty that may cause the variability in pre-planned stop location arrival times due to traffic variability. Alternatively, GPS and pre-programmed stop locations may also be used alone without timetables to identify mission related stop events.

In another embodiment, such as for package delivery vehicles, the vehicle mission-related stop events can be determined by the packages delivery locations and/or scheduled pick-up locations along with the vehicle drive cycle for a particular day and/or route. This route and payload data can be initially input into a separate computerized tracking system and then processed and uploaded into the vehicle controller 40 or into any on-board computerized device. The computerized payload and route tracking system includes a driving route, a number of stop locations along the driving route, a stop duration for each stop location, and a payload weight change associated with each stop location. This route and payload data may also include optimal driving route and delivery sequence data to minimize driving time and fuel consumption. This information when combined with GPS data permits accurate identification of mission related loading and unloading stop events.

In response to conditional 208 being positive and the stop event type being mission related, procedure 200 continues at operation 210 to deviate from nominal engine start-stop control logic. For example, since the mission related stop event type includes one or more known parameters, such as a stop location, stop duration, payload associated with stop event, and/or travel zone restrictions such as zero-emission based route locations, that are input into controller 40 before the stop event occurs, controller 40 deviates from the nominal engine start-stop control logic at operation 210 to alter one or more of a timing of an engine stop, a duration of an engine stop, an occurrence or lack of occurrence of an engine stop, one or more limits, an energy source selection, or other operating condition of the vehicle during the mission related engine stop event. The stop event type can be provided as a stop event type input to a control module or logic block of controller 40, which outputs a decision on whether to override the nominal engine start-stop control or to allow the nominal engine start-stop control to operate.

In certain embodiments, the nominal engine start-stop control logic employs a confirmation time to ensure any stop event is not overly brief before stopping the engine. When a stop event type is identified as a mission related stop event, the use of the confirmation time can be disabled at operation 210. In addition, transmission or driveline related control decisions could vary from the nominal engine start-stop control logic in response to a stop event being identified as mission related. For example, a driveline lock mechanism 101, similar to placing a transmission in PARK, could be automatically engaged in response to mission related stop events at operation 210, but not enabled for non-mission related stop events such as a traffic-related stop. In a further embodiment, the timing of when an engine re-start occurs is altered for a mission related stop event at operation 210 from that of a non-mission related stop event. For example, certain stop locations may require engine noise-free or noise-reduced stops when pulling into, sitting at, and/or pulling away from the scheduled stop, whereas such restrictions may not be required at a non-mission related stop event. Therefore, the nominal engine starting control logic is employed at non-mission related stops, and engine stoppage is extended at operation 210 relative to the nominal engine start-stop control logic for mission related stop events.

Procedure 200 continues at conditional 214 to determine if a payload change has occurred during the mission related stop event. The determination of the payload change can be made in any suitable automatic manner, such as by an automated passenger count to estimate passenger mass, a cargo pick-up and drop-off schedule including associated package/cargo weights to be added or removed at each location along the route that is input to controller 40, or a vehicle mass estimation algorithm, for example. If conditional 214 is negative, procedure 200 continues at operation 216 to operate according to current or nominal energy consumption control parameters. If conditional 214 is positive, then procedure 200 continues at operation 218 to adjust one or more energy consumption control parameters in response to a payload change amount.

Various adjustments to one or more energy consumption parameters are contemplated at operation 218 to plan overall power and energy needs of the vehicle during a trip that includes mission-related stop events. For example, the change in mass that occurs at each mission related stop event can be integrated with route based energy management systems to improve operation economy and energy consumption during the trip. In one embodiment, the operation of accessories such as an HVAC system can be optimized in response to a passenger count. In other embodiments, data regarding the dynamically changing payload along the route can adjust battery SOC management, algorithms for operating generator sets, and/or accessory power management algorithms to help improve battery life, fuel consumption and passenger comfort. In still other embodiments, the selection of the energy source (such as fuel or electrical energy) can be prioritized in response to one or more route based operating requirements and the location of the vehicle along the route.

Payload change data can also be provided as a dynamic input to a machine mass estimation (MME) algorithm of controller 40 to update total vehicle mass which in turn can help improve other fuel economy features which use MME as an input. Controller 40 may determine vehicle mass from an estimate based on the torque output of the hybrid power system 30, or through programming or telematics from an intelligent transportation system or weigh station. In addition, since in certain embodiments the vehicle runs a same route over several days, a learning algorithm that tracks vehicle payload variations throughout the route for any given time of day and location can be used to develop predictive algorithms to predict future energy needs of the vehicle. With the information regarding the location of pick-up/delivery and payload weight variations along the route, a predictive algorithm can also predict future energy needs for the vehicles and adjust battery state of charge (SOC) management and/or genset operations for accessories in response to the predicted upcoming variations in vehicle weight.

From operation 216 or operation 218, procedure 200 continues at conditional 220 to determine if the stop event has concluded. If conditional 220 is negative, procedure 200 can return to operation 210. If conditional 220 is positive, procedure 200 can return to operation 204.

Figure 3:
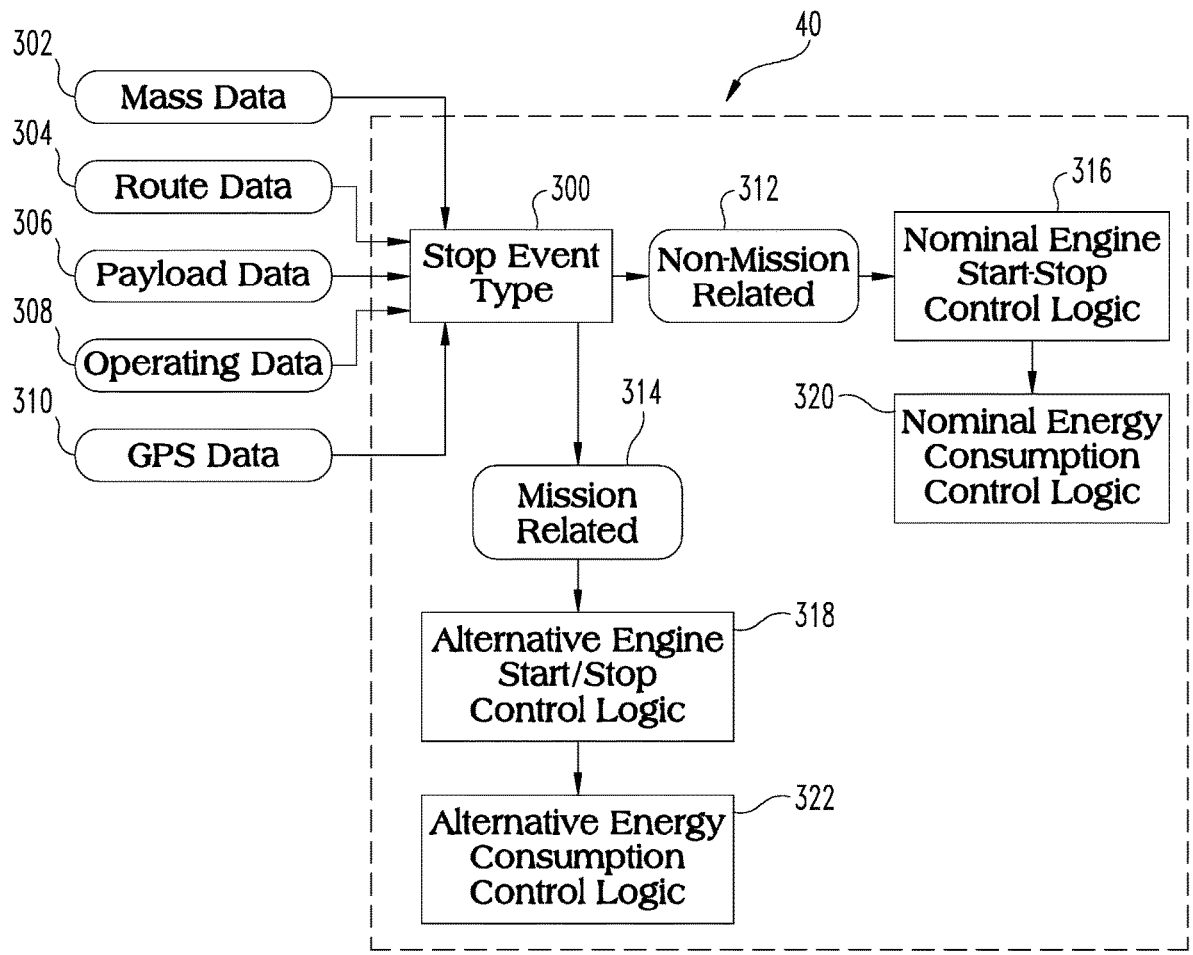
FIG. 3 illustrates a schematic diagram of an exemplary engine start-stop controller.

Referring now to FIG. 3, one example embodiment for controller 40 is provided. Controller 40 is operably connectable to internal combustion engine 32 and motor/generator 36 of vehicle 20 where, in one embodiment, the motor/generator 36 is operable to start the internal combustion engine 32 from mission related and non-mission related control stops as commanded by the controller 40. In FIG. 3, controller 40 include a start-stop event type determination block 300 that determines whether a stop event for the vehicle is a mission related stop event type or a non-mission related stop event type. Block 300 can receive various inputs such as, by way of illustration and not limitation, mass data 302 associated with the vehicle and/or its payload, route data 304 associated with the predetermined route, payload data 306 associated with the passengers, packages and/or cargo of the vehicle, operating data 308 associated with any component, part, subsystem or fluid of the vehicle, and GPS data 310. In certain embodiments, the route data 304 includes one or more predetermined stop locations and stop durations for each of the stop locations along the route that are mission related. In a further embodiment, payload data 304 includes passenger and/or package or other cargo weights associated with each of the predetermined stop locations. The payload can include one or both of payload that is dropped off at each location and/or that is picked up at each location.

Start-stop event type determination block 300 includes control logic that is configured to determine a stop event type associated with a vehicle stop event. As discussed above, the stop event type determination can be based on the route data and/or payload data that is input into controller 40 before the stop event occurs. Start-stop event type determination block 300 makes either a non-mission related stop event determination 312 or a mission related stop event determination 314 in response to this data. Determining the stop event type associated with the vehicle stop event may include, for example, comparing clock data with a timetable stored in a memory of the controller 40 and/or comparing route data stored in a memory of the controller 40 with GPS data 310.

In response to a non-mission related stop event determination 312, controller 140 selects a nominal engine start-stop control logic block 316 for operation of the engine 32 and motor/generator 36. The duration of the non-mission related stop event is typically unknown and variable in length. In response to a mission related stop event determination 314, controller 140 selects an alternative engine start-stop control logic block 318 for operation of the engine 32 and motor/generator 36.

The stop duration of the mission related stop event can be of known duration, and payload variations may also be known in advance of the mission related stop event. Therefore, deviation from nominal limits or other nominal operating parameters of the vehicle 20 may be desirable and employed with the alternative engine start-stop control logic. For example, deviations from the one or more nominal engine start-stop control parameters includes at least one of extending a nominal engine stop duration, shortening the nominal engine stop duration, and preventing or inhibiting movement of the vehicle during the vehicle stop event such as by automatically engaging a driveline lock 101.

In response to a non-mission related stop event determination 312, controller 140 may also select a nominal energy consumption control logic block 320 for operation of one or more of the components of vehicle 20, such as the accessories 92, energy storage device 70, and the power electronics 80. In response to a mission related stop event determination 314, controller 140 selects an alternative energy consumption control logic block 322 for operation of one or more of the components of vehicle 20, such as the accessories 92, power storage device 70, and the power electronics 80. In one embodiment, alternative energy consumption control logic block 322 is configured to determine a mass of the vehicle associated with the mission related stop event type and adjust one or more energy consumption control parameters of the vehicle based on a change in the mass of the vehicle from a previous stop event. The mass can be determined in any suitable manner as discussed herein, including by a mass estimation algorithm, an automated passenger count, and by weight of the payload scheduled to be picked-up and dropped-off as input by a computerized payload and route tracking system, for example. The computerized tracking systems can include, for example, a predetermined schedule of packages with associated weights to be picked up and/or dropped off at the various predetermined stop locations along a predetermined route. The one or more energy consumption control parameters that can be adjusted from nominal include changing SOC or other limits of power storage device 70, operation of motor-generator 36, operation of an HVAC type of accessory 92, and/or operation of one or more other types of accessories 92 of the vehicle.

Figure 4:
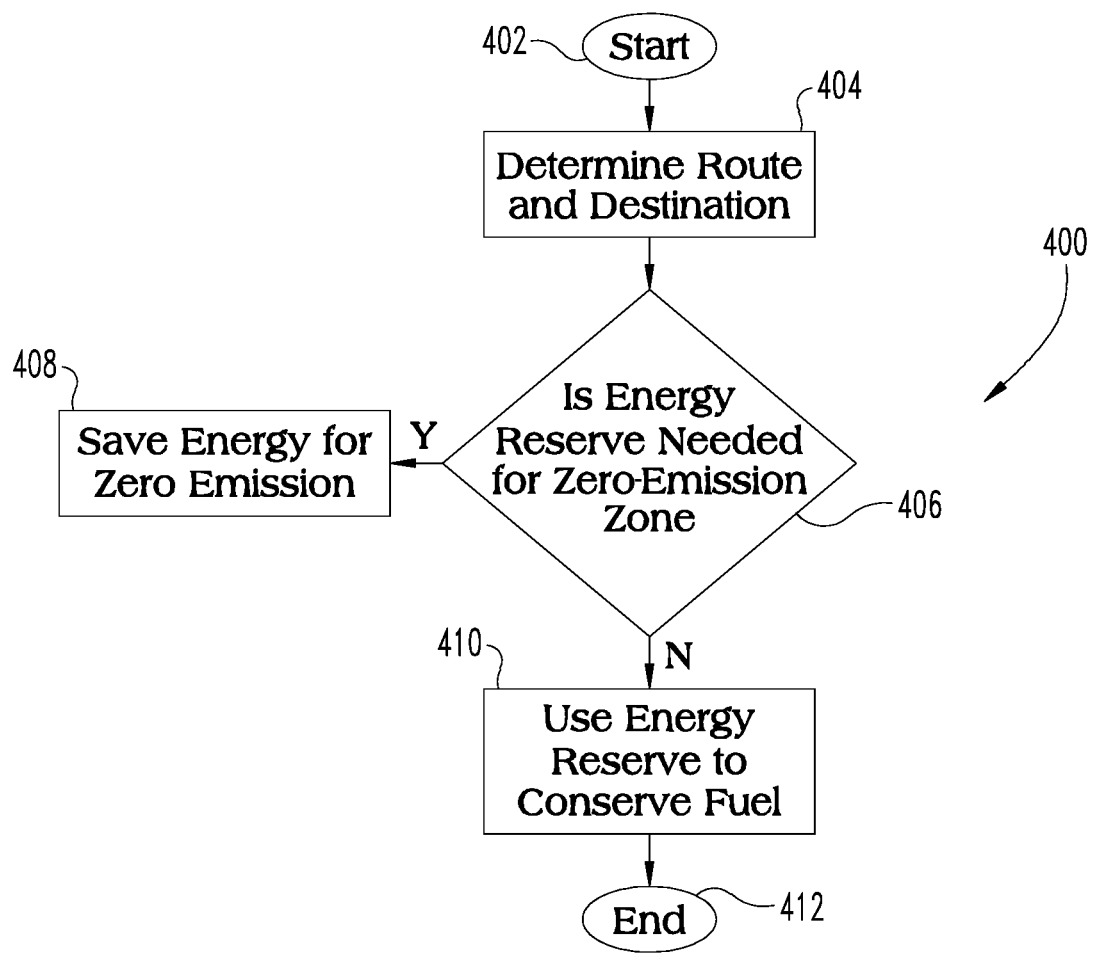
FIG. 4 illustrates a flow diagram of another embodiment exemplary procedure for an engine start-stop operation.

With reference to FIG. 4 there is illustrated a flow diagram of exemplary procedure 400 which may be implemented in a control system, for example, such as a control system including controller 40 described above. In one embodiment, the control system is part of a fleet management system for multiple vehicles 40 that employs logistics information and route planning for vehicle selection, efficiency optimization, and/or adjustment of one or more energy consumption control parameters of a vehicle along the route, such as by deviating from a nominal start-stop control logic in response to one or more predetermined route based operating requirements.

The controller 40 operates according to procedure 400 in one embodiment to identify opportunities for using the reserve energy in storage device 70 to power the vehicle 20 and conserve fuel. Procedure 400 begins with start operation 402, and continues at operation 404 to determine a route and a destination of the vehicle 20. From operation 404, procedure 400 continues at decision 406 to determine if the energy reserve in storage device 70 is needed for a predetermined route based operating requirement that requires a deviation from a nominal engine start-stop control logic. For example, a zero-emission travel zone or zones along an assigned route of vehicle 20 may be identified as a predetermined route based operating requirement. In response to one or more predetermined route based operating requirements, operation 408 may include deviating from the nominal start-stop control logic and saving sufficient electrical energy reserves for travel through the zero-emission zone using electrical energy only (or predominantly), to save electrical energy reserves in storage device 70 in the event a detour through a zero-emission zone is needed, or to satisfy some other route based operating requirement. If the energy reserve is not needed for a route based operating requirement, operation 410 may use the nominal start-stop control logic to propel vehicle 20, such as to conserve fuel. The procedure ends at operation 412 at the conclusion of the route or in response to a re-set condition, for example. Procedure 400 may also include adjusting one or more energy based type parameters with controller 40, based on one or more energy control inputs, for example, the SOC/SOH of storage device 70 of the vehicle 20 and one or more predetermined route-based operating requirements.

Knowing route and destination prior to traversing the route can allow the system to better utilize the energy stored in storage device such as, for example, holding electrical energy in reserve to cover zero-emission zone travel along the route. If one or more zero-emission travel zones are anticipated on the route for the day, the electrical energy storage may be fully utilized to meet zero-emission zone requirements rather than optimize fuel savings or otherwise operate according to a nominal start-stop control logic. In another example, if the route will take the vehicle near a zero-emission zone but not into it, the system controller 40 can be configured to maintain a sufficient reserve energy in case a detour takes the vehicle into the zero-emission travel zone.

Figure 5:
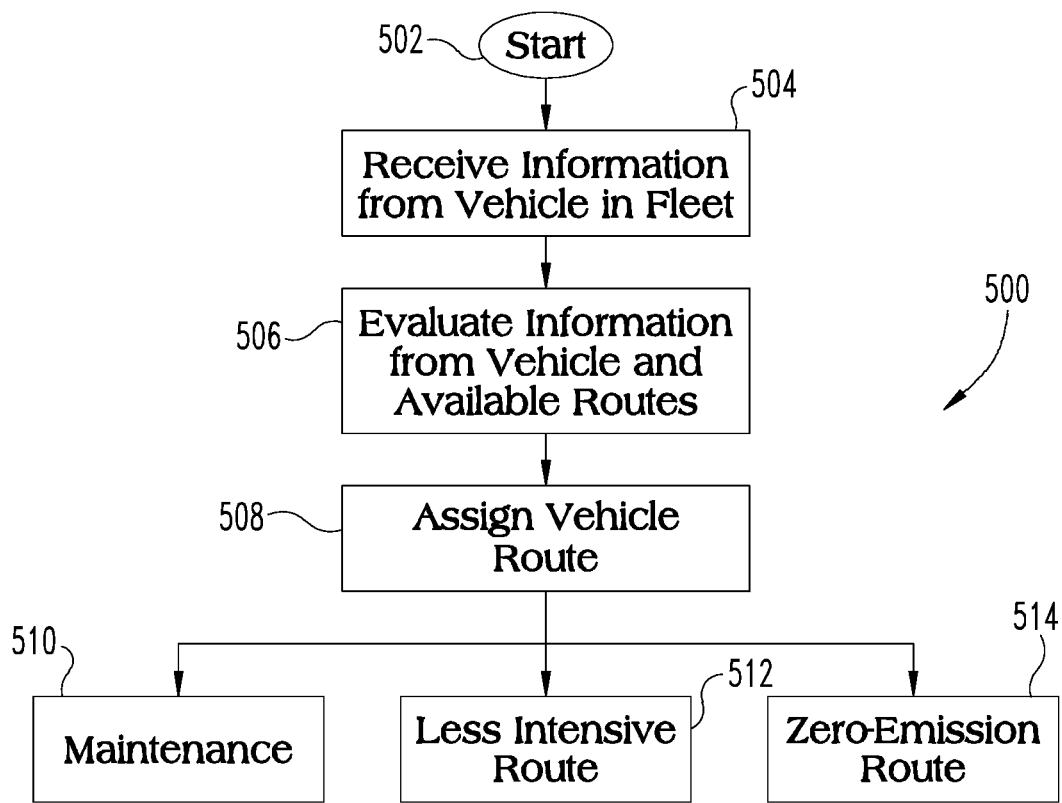
FIG. 5 illustrates a flow diagram of another embodiment exemplary procedure for assigning one or more vehicles to a route.

With reference to FIG. 5 there is illustrated a flow diagram of exemplary engine control procedure 500 which may be implemented in a control system, for example, such as a control system with controller 40 providing information to, for example, a remote logistics tool, such as a central computer server. In one embodiment, the procedure 500 may include selection of an appropriate route and/or vehicle from a plurality of routes and/or vehicles associated with a vehicle fleet. For example, the selection can be based on energy storage parameters of the vehicle as compared to other vehicles in the fleet and the stored energy requirements for the route.

Procedure 500 begins with start operation 502 and continues at operation 504 to receive capability information, such as energy storage parameters, from one or more of the vehicles in the fleet, regarding the vehicle's capability to carry out one or more routes. For example, the energy storage parameters may include state-of-charge/state-of-health (SOC/SOH) of energy storage device 70. Procedure 500 continues at operation 506 to evaluate the capability information such as the SOC/SOH information from each fleet vehicle and the available vehicle routes. Procedure 500 continues from operation 506 at operation 508 to assign a vehicle route to a vehicle 20 based on the capability information from each vehicle in the vehicle fleet, and the requirements of the available routes. For example, one or more vehicles may be designated for maintenance at operation 508, may be designated to a less intensive route at operation 512 if the capability information indicates the energy storage device is not fully charged or has a reduced capacity, or may be assigned to a special route at operation 514 such as a zero-emission route.

The vehicles of the system may be configured provide capability information such as battery SOC, or battery SOH to the logistics tools. The information can be used in conjunction with route planning tools to assign vehicles to particular routes. For example, a vehicle may return from a route without sufficient time to receive the required maintenance, such as a battery recharge, or some other issue prevents a complete recharge. The system can be configured to broadcast this information wirelessly and the logistics tools associated with the server and/or vehicles can determine which vehicles can be assigned to particular routes based on the capability information for each vehicle. For example, vehicle(s) with full capabilities can be assigned to the most intensive routes, while a vehicle with limited capabilities can be assigned to a less intensive route or a route that is not as adversely affected by a degraded capability condition. The fleet operator may also use this information to schedule a maintenance event.

Various aspects of the present disclosure are contemplated. In one embodiment, a method includes operating a vehicle including an internal combustion engine and a controller configured to conditionally stop and re-start the internal combustion engine in response to a vehicle stop event; determining a stop event type associated with the vehicle stop event; stopping, with the controller, the internal combustion engine during the vehicle stop event with one or more nominal engine start-stop control parameters in response to a first stop event type being determined by the controller; and stopping, with the controller, the internal combustion engine during the vehicle stop event with one or more alternative engine start-stop control parameters that deviate from the one or more nominal engine start-stop control parameters in response to a second stop event type being determined by the controller, where at least one of a location and a payload associated with the second stop event type is provided as an input to the controller before the vehicle arrives at the stop event.

In one embodiment, the location and a stop duration at the location are provided as the input to the controller and the second stop event type is a mission-related stop event of the vehicle for at least one of a payload pick-up and a payload drop-off for the vehicle at the location. In a refinement of this embodiment, the payload associated with each of a plurality of the second stop event types is provided as the input to the controller. In a further refinement, the payload includes at least one of packages and passengers to be carried by the vehicle to or from the location.

In another embodiment, the method includes determining a mass of the vehicle associated with the stop event type and adjusting one or more energy consumption control parameters of the vehicle based on a change in the mass of the vehicle from a previous stop event. In a refinement of this embodiment, the adjusting one or more energy consumption control parameters includes adjusting one or more of an energy storage device of the vehicle, a motor-generator of the vehicle, an HVAC system of the vehicle, and one or more accessories of the vehicle. In another refinement, the mass of the vehicle is determined at least in part based on an automated passenger count for the vehicle. In yet another refinement, the mass of the vehicle is determined at least in part based on a mass estimation algorithm performed by the controller. In still another refinement, the mass of the vehicle is determined at least in part based on a computerized payload and route tracking system that is input into the controller before the vehicle arrives at the stop event. In a further refinement, the computerized payload and route tracking system includes a driving route, a number of stop locations along the driving route, a stop duration for each stop location, and a payload weight change associated with each stop location.

In another embodiment of the method, the one or more alternative engine start-stop control parameters deviate from the nominal engine start-stop control parameters by at least one of the following: extending a nominal engine stop duration, shortening the nominal engine stop duration, and preventing or inhibiting movement of the vehicle during the vehicle stop event. In yet another embodiment, determining the stop event type associated with the vehicle stop event includes comparing clock data with a timetable stored in a memory of the controller.

In another embodiment, determining the stop event type associated with the vehicle stop event includes comparing route data stored in a memory of the controller with GPS data. In yet another embodiment, the first stop event type is a traffic-related stop event. In a further embodiment, the vehicle includes a hybrid power train with a motor/generator selectively engageable to a crankshaft of the internal combustion engine with a hybrid clutch. In another embodiment, the vehicle further includes a motor/generator system operatively coupled with the internal combustion engine, and an energy storage system operatively coupled with the motor/generator system.

According to another aspect, an apparatus is provided that includes a controller operably connectable to an internal combustion engine and a motor/generator of a vehicle. The motor/generator is operable to start the internal combustion engine from a nominal control stop commanded by the controller. The controller is configured to determine a stop event type associated with a vehicle stop event and to select a nominal engine start-stop control algorithm for stopping and starting the internal combustion engine in response to a first stop event type and to select an alternative engine start-stop control algorithm for stopping and starting the engine that deviates from nominal engine start-stop control algorithm in response to a second stop event type that differs from the first stop event type.

In one embodiment, at least one of a location and a payload associated with the second stop event type is provided as an input to the controller before the vehicle arrives at the stop event. In a refinement of this embodiment, the location and a stop duration at the location are provided as the input to the controller. In a further refinement of this embodiment, the payload associated with the vehicle at each of a plurality of second stop event types is provided as the input to the controller.

In one embodiment, the second stop event type includes a fixed duration and the first stop event type includes a variable duration. In another embodiment, the first stop event type is a traffic-related stop event and the second stop event type is a vehicle mission-related stop event. In a refinement of this embodiment, the vehicle mission-related stop event includes at least one of a delivery of packages, a delivery of passengers, a pick-up of packages, and a pick-up of passengers. In another embodiment, the second stop event type is a zero-emission travel zone.

According to another aspect of the present disclosure, a system includes a vehicle including an internal combustion engine, a transmission, and a clutch connecting the internal combustion engine and the transmission. The vehicle includes a motor/generator operable to start the internal combustion engine and a controller operably connected to the internal combustion engine and the motor/generator. The controller is configured to conditionally execute a nominal control stop of the internal combustion engine in response to a first stop event type for the vehicle. The controller is further configured to execute an alternate control stop of the internal combustion engine that deviates from the nominal control stop in response to a second stop event type for the vehicle. At least one of a location and a payload associated with the second stop event type is provided as an input to the controller before the vehicle arrives at either of the first or second stop events.

According to one embodiment, the motor/generator is operable to propel the vehicle when the internal combustion engine is stopped. According to another embodiment, each of the location and the payload associated with the second stop event type are provided as inputs to the controller before the vehicle arrives at either of the first or second stop events. In a refinement of this embodiment, a duration for the second stop event type at the location is provided as an input to the controller before the vehicle arrives at either of the first or second stop events. In a further refinement, the location, payload and stop duration are received from at least one of a timetable, a delivery schedule, and a computerized payload and route tracking system.

According to another embodiment, the first stop event type is a traffic-related stop event and the second stop event type is a vehicle mission-related stop event. In another embodiment, the vehicle mission-related stop event includes at least one of a delivery of packages, a delivery of passengers, a pick-up of packages, and a pick-up of passengers. In another embodiment, the second stop event type is a zero-emission travel zone.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    operating a vehicle including an internal combustion engine and a controller configured to conditionally stop and re-start the internal combustion engine in response to a vehicle stop event;
    determining, by the controller, a stop event type associated with the vehicle stop event; and
    stopping the internal combustion engine based on the determined stop event type being a first stop event type that is a non-scheduled stop event and a second stop event type that is a scheduled stop event,
    wherein the controller is configured to selectively stop the internal combustion engine during the vehicle stop event with one or more nominal engine start-stop control parameters in response to the first stop event type and stop the internal combustion engine during the vehicle stop event with one or more alternative engine start-stop control parameters that deviate from the one or more nominal engine start-stop control parameters in response to the second stop event type, wherein a location and a payload for each scheduled stop event associated with the second stop event type are each provided as an input to the controller before the vehicle arrives at the stop event.

2. The method of claim 1, wherein the location and a stop duration at the location are provided as the input to the controller and the second stop event type is a mission-related stop event of the vehicle for at least one of a payload pick-up and a payload drop-off for the vehicle at the location, wherein the controller is configured to identify the second stop event type as the scheduled stop event via a timetable stored in the controller in conjunction with a GPS verification of the location.

3. The method of claim 2, wherein the payload associated with each of a plurality of the second stop event types is provided as the input to the controller.

4. The method of claim 3, wherein the payload includes at least one of packages and passengers to be carried by the vehicle to or from the location.

5. The method of claim 1, further comprising determining a mass of the vehicle associated with the stop event type and adjusting one or more energy consumption control parameters of the vehicle based on a change in the mass of the vehicle from a previous stop event.

6. The method of claim 5, wherein the adjusting one or more energy consumption control parameters includes adjusting one or more of an energy storage device of the vehicle, a motor-generator of the vehicle, an HVAC system of the vehicle, and one or more accessories of the vehicle.

7. The method of claim 5, wherein the mass of the vehicle is determined at least in part based on an automated passenger count for the vehicle.

8. The method of claim 5, wherein the mass of the vehicle is determined at least in part based on a mass estimation algorithm performed by the controller.

9. The method of claim 5, wherein the mass of the vehicle is determined at least in part based on a computerized payload and route tracking system that is input into the controller before the vehicle arrives at the stop event.

10. The method of claim 9, wherein the computerized payload and route tracking system includes a driving route, a number of stop locations along the driving route, a stop duration for each stop location, and a payload weight change associated with each stop location.

11. The method of claim 1, wherein the one or more alternative engine start-stop control parameters deviate from the nominal engine start-stop control parameters by at least one of the following: extending a nominal engine stop duration, shortening the nominal engine stop duration, and preventing or inhibiting movement of the vehicle during the vehicle stop event.

12. The method of claim 1, wherein determining the stop event type associated with the vehicle stop event includes comparing clock data with a timetable stored in a memory of the controller.

13. The method of claim 1, wherein determining the stop event type associated with the vehicle stop event includes comparing route data stored in a memory of the controller with GPS data.

14. The method of claim 1, wherein the first stop event type is a traffic-related stop event.

15. The method of claim 1, wherein the vehicle includes a hybrid power train with a motor/generator selectively engageable to a crankshaft of the internal combustion engine with a hybrid clutch.

16. The method of claim 1, wherein the vehicle further includes a motor/generator system operatively coupled with the internal combustion engine, and an energy storage system operatively coupled with the motor/generator system.

17. An apparatus comprising:
a controller operably connectable to an internal combustion engine and a motor/generator of a vehicle wherein the motor/generator is operable to start the internal combustion engine from a nominal control stop commanded by the controller, wherein the controller is configured to determine a stop event type associated with a vehicle stop event and to select a nominal engine start-stop control algorithm for stopping and starting the internal combustion engine in response to a first stop event type that is a non-scheduled stop event and to select an alternative engine start-stop control algorithm for stopping and starting the engine that deviates from nominal engine start-stop control algorithm in response to a second stop event type that differs from the first stop event type and is a scheduled stop event, wherein a location and a payload associated with the second stop event type are each provided as an input to the controller before the vehicle arrives at the stop event.

18. The apparatus of claim 17, wherein the location and a stop duration at the location are provided as the input to the controller, wherein the controller is configured to identify the second stop event type as the scheduled stop event via a timetable stored in the controller in conjunction with a GPS verification of the location.

19. The apparatus of claim 18, wherein the payload associated with the vehicle at each of a plurality of second stop event types is provided as the input to the controller.

20. The apparatus of claim 17, wherein the second stop event type includes a fixed duration and the first stop event type includes a variable duration.

21. The apparatus of claim 17, wherein the first stop event type is a traffic-related stop event and the second stop event type is a vehicle mission-related stop event.

22. The apparatus of claim 21, wherein the vehicle mission-related stop event includes at least one of a delivery of packages, a delivery of passengers, a pick-up of packages, and a pick-up of passengers.

23. The apparatus of claim 17, wherein the second stop event type is a zero-emission travel zone.

24. A system, comprising:
a vehicle including an internal combustion engine, a transmission, and a clutch connecting the internal combustion engine and the transmission, the vehicle including a motor/generator operable to start the internal combustion engine; and
a controller operably connected to the internal combustion engine and the motor/generator, wherein the controller is configured to conditionally execute a nominal control stop of the internal combustion engine in response to a first stop event type for the vehicle that is a non-scheduled stop event, wherein the controller is further configured to execute an alternate control stop of the internal combustion engine that deviates from the nominal control stop in response to a second stop event type for the vehicle that is a scheduled stop event, wherein a location and a payload associated with the second stop event type are each provided as an input to the controller before the vehicle arrives at either of the non-schedule or scheduled stop events.

25. The system of claim 24, wherein the motor/generator is operable to propel the vehicle when the internal combustion engine is stopped.

26. The system of claim 24, wherein a duration for the second stop event type at the location is provided as an input to the controller before the vehicle arrives at either of the first or second stop events, wherein the controller is configured to identify the second stop event type as the scheduled stop event via a timetable stored in the controller in conjunction with a GPS verification of the location.

27. The system of claim 24, wherein the location, payload and stop duration are received from at least one of a timetable, a delivery schedule, and a computerized payload and route tracking system.

28. The system of claim 24, wherein the first stop event type is a traffic-related stop event and the second stop event type is a vehicle mission-related stop event.

29. The system of claim 24, wherein the vehicle mission-related stop event includes at least one of a delivery of packages, a delivery of passengers, a pick-up of packages, and a pick-up of passengers.

30. The system of claim 15, wherein the second stop event type is a zero-emission travel zone.

31. A method comprising:
determining a route based operating requirement for a route of a vehicle, wherein the vehicle includes a controller configured to conditionally stop and re-start an internal combustion engine of the vehicle along the route;
evaluating a capability condition of a plurality of vehicles for carrying out the route based on the route based operating requirement and assigning the vehicle from the plurality of vehicles based on the ability of the vehicle to satisfy the route based operating requirement and
stopping, with the controller, the internal combustion engine along the route with one or more alternative engine start-stop control parameters that deviate from one or more nominal engine start-stop control parameters in response to the route based operating requirement, wherein the route based operating requirement is provided as an input to the controller before the vehicle starts the route.

32. The method of claim 31, wherein the route based operating requirement is a zero-emission travel zone and the one or more alternative engine start-stop control parameters stop the engine in response to the vehicle being located in the zero-emission travel zone.

33. The method of claim 31, wherein the capability condition includes a state-of-charge/state-of-health of an energy storage device of the vehicle.

* * * * *